March 15, 1966   A. B. NEWBURY ETAL   3,240,426
METER REGISTER AND DRIVE MECHANISM THEREFOR
Original Filed March 14, 1952   2 Sheets-Sheet 1
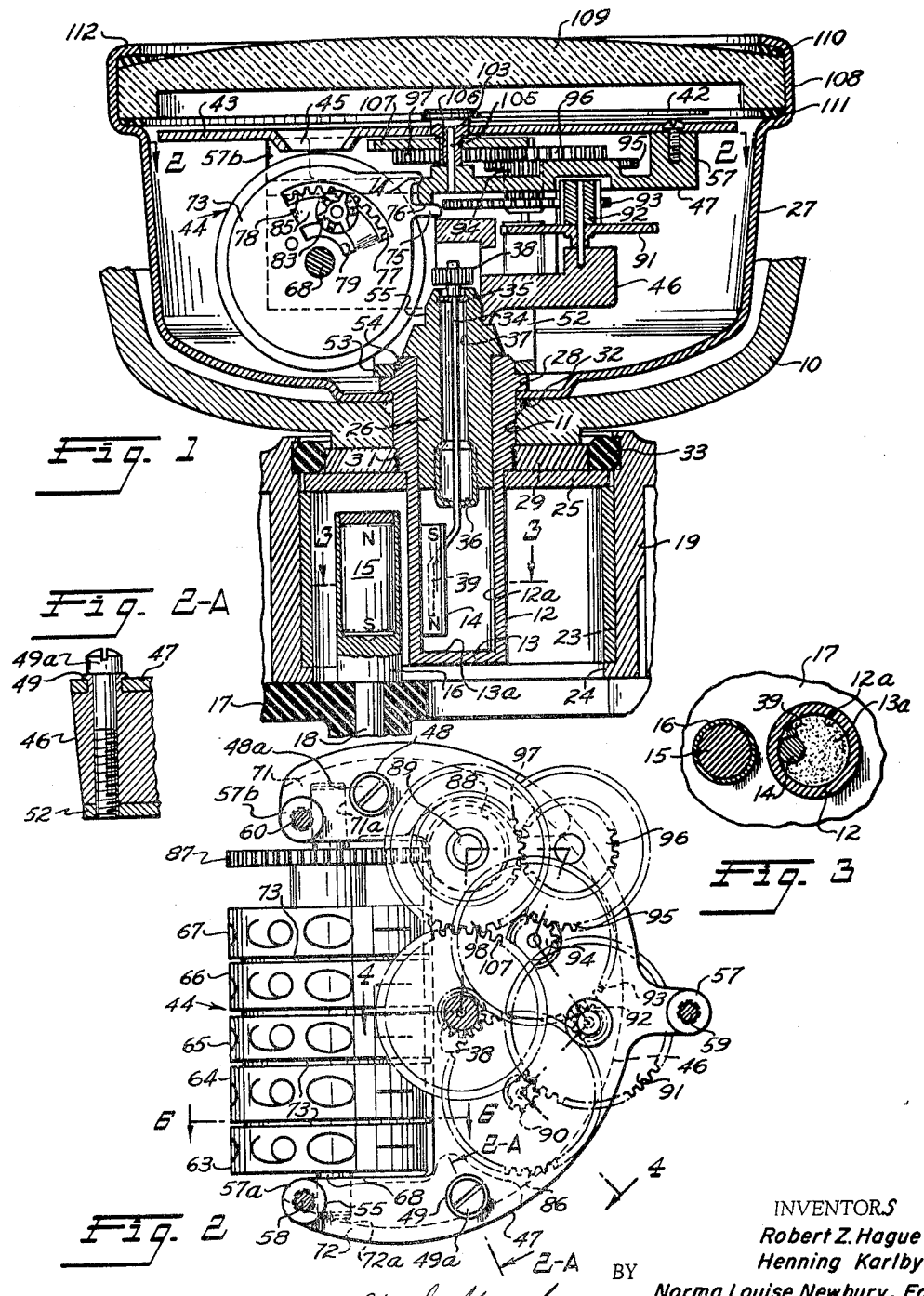
INVENTORS
Robert Z. Hague
Henning Karlby
Norma Louise Newbury, For
The Estate Of Amos B.
Newbury-Deceased
ATTORNEYS March 15, 1966 A. B. NEWBURY ETAL 3,240,426
METER REGISTER AND DRIVE MECHANISM THEREFOR
Original Filed March 14, 1952 2 Sheets-Sheet 2

INVENTORS
Robert Z. Hague
Henning Karlby
BY Norma Louise Newbury, For
The Estate Of Amos B. Newbury
Deceased
ATTORNEYS & # United States Patent Office 3,240,426
Patented Mar. 15, 1966

3,240,426
METER REGISTER AND DRIVE MECHANISM
THEREFOR
Amos B. Newbury, deceased, late of Murrysville, Pa., by
Norma Louise Newbury, executrix, Murrysville, Pa.,
Robert Z. Hague, Oradell, N.J., and Henning Karlby,
Pittsburgh, Pa.; said Norma Louise Newbury, executrix
of the estate of said Amos B. Newbury, deceased, assignor to Rockwell Manufacturing Company, Pittsburgh, Pa., a corporation of Pennsylvania
Application Oct. 25, 1957, Ser. No. 694,473, which is a division of application Ser. No. 276,652, Mar. 14, 1952, now Patent No. 2,858,461, dated Oct. 28, 1958. Divided and this application June 10, 1963, Ser. No. 286,845
7 Claims. (Cl. 235—94)

The present invention relates to fluid meters and, in particular, to fluid meter register drive mechanisms. This application is a division of application No. 694,473 filed Oct. 25, 1957, which in turn is a division of application No. 276,652 filed Mar. 14, 1952, and issued on Oct. 28, 1958 as Patent No. 2,858,461.

Fluid flow meters of the type to which the present invention relates are commonly utilized as water consumption meters. In thus using prior art meters of this type, however, a serious problem has arisen. Two different units are widely employed for measuring water consumption, cubic feet and gallons. Therefore, for a meter manufacturer to provide a product which is acceptable in all locales, he must manufacture and stock register units having register operating drive trains with two different train velocity ratios and, therefore, train gears and pinions of differing sizes. This increases the number of parts which must be stocked and the cost of maintaining an adequate parts inventory.

It is therefore one object of the present invention to provide a novel meter register drive train which decreases the number of components necessary to provide register equipped meters with registration in alternate ones of two units of measurement.

Another object of the present invention resides in the provision of a register equipped flow meter having a register drive train permitting registration in alternate ones of two units of measurement without the necessity of providing additional or substitute drive train components.

A specific object of the present invention resides in the provision of a novel meter register having a drive train with two gear clusters which, upon transposition, provide registration in alternate ones of two units of measurement.

In general, the novel meter register drive train of the present invention, by which the foregoing objects are achieved, includes rotatably mounted input and output pinions in the form of spur gears and a pair of transposable or interchangeable gear clusters, each including a spur gear and a pinion fixed together into a unitary assembly. The gears of the two clusters, which mesh with the input pinion, have equal numbers of teeth so the drive train velocity ratio is effected only by the velocity ratio of the two pinions in the interchangeable gear clusters. By selecting pinions having the proper number of teeth, the register drive train may be so constructed that, when one of the two pinions is driving the meter will register in one of two desired units and, conversely, in the other unit when the other of the two pinions is driving.

The advantages of this novel register drive train are self-evident. Registration in alternate units is provided without adding, deleting, or substituting components. Consequently, the number of components which must be stocked is reduced to a minimum, substantially decreasing the cost of maintaining an adequate parts inventory. Variations in assembly procedures become inconsequential. The number of additional fixtures required to assemble the registers is reduced to a minimum.

The use of interchangeable gears to provide a drive train having two train values is not in itself claimed to be novel. This broad concept is found in United States Patent Nos. 614,251 issued Nov. 15, 1898, to F. A. Kershaw for Bevel Gear and 1,167,887 issued Jan. 11, 1916 to F. F. Clarke for Drill Press. Both of these patents employ interchangeable bevel gears which are not suitable for use in meter register drive trains for several reasons. For example, bevel gears are too expensive to manufacture to be economically feasible for meter register drive trains. As a further example, spur gears would require more space and a more complex shaft supporting structure than the spur gear drive train provided by the present invention.

Other objects and further novel features of the present invention will become apparent as the description proceeds in connection with the accompanying drawings and from the scope of the appended claims.

FIGURE 1 is an enlarged vertical sectional view of a preferred embodiment of our improved gear train and register assembly and associated magnetic drive;

FIGURE 2 is a partial horizontal sectional view taken substantially along the line 2—2 of FIGURE 1;

FIGURE 2A is a fragmentary sectional view taken along the line 2A—2A of FIGURE 2;

FIGURE 3 is a horizontal sectional view of the magnetic drive, taken along the line 3—3 of FIGURE 1;

MAGNETIC DRIVE MECHANISM

Figure 4:
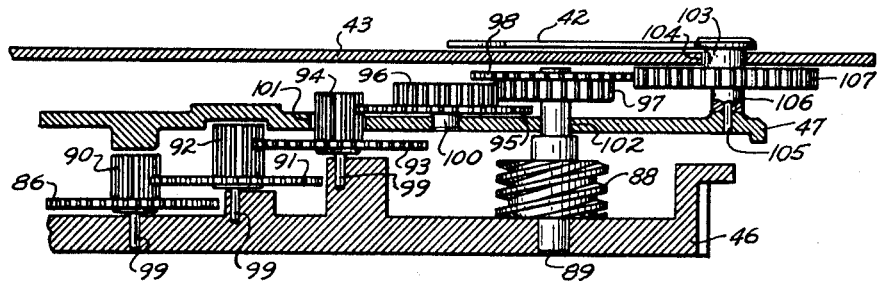
FIGURE 4 is an irregular vertical section taken along the line 4—4 of FIGURE 2, showing the interaction of the members of the gear train of the register assembly.

Referring to FIGURE 1 of the drawings, 10 indicates a portion of a cup-shaped wall of the meter housing, dividing the meter mechanism from the register mechanism, as shown in greater detail in the patent referred to above. Centrally of the bottom thereof, the wall 10 has an opening 11 through which passes a tubular member 12 formed of non-magnetic material and having an integral bottom end wall 13. The inner cylindrical wall 12a of member 12 forms a raceway for the relatively small driven magnetic roller member 14 of the magnetic drive for the register. A driving member 15, formed of magnetic material and contained in a non-magnetic housing 16, moves in a circular path about the axis of the tubular member 12. In the disclosed embodiment of our invention, housing 16 and member 15 are moved in such path by an oscillating piston member 17, to which the housing 16 is centrally secured by a pin 18. At least one, and preferably both of the driving and driven magnetic members 15 and 14 are permanent magnets, member 14 being cylindrical so as to roll around the inner wall of tubular member 12. In practice a permanent magnet .125 inch in diameter and .500 inch long gives excellent results with the mechanism shown and described. When members 14 and 15 are both permanent magnets their upper ends are of opposite polarity, as are their lower ends, as indicated in FIGURE 1.

MAGNETIC REGISTER DRIVE

Driven member 14 is normally held in contact with cylindrical side wall 12a above the internal surface 13a of end wall 13 by the magnetic attraction to driving member 15. Under the influence of the magnetic attraction between members 14 and 15, driven member 14 is caused to roll in a path along cylindrical surface 12a in radial and axial alignment with the driving member as driving member 15 moves in its circular path.

Since there is no axial restraint upon the driven member 14, if for any reason the driving and driven members should become separated, that is if members 14 and 15 become radially misaligned, the weight of the driven member 14 will overcome the supporting force of magnetic attraction to driving member 15 and will, therefore shift axially downward under the influence of gravity into engagement with surface 13a. Surface 13a is roughened to form a friction brake surface. Frictional engagement of the lower end of driven member 14 with the braking surface 13a is sufficient to prevent movement of the driven member toward the driving member as the driving member approaches the driven member. The driven member will therefore remain at rest upon braking surface 13a until the driving member comes to a position adjacent the driven magnet or, considered in another way, until radial alignment of members 14 and 15 is re-established. At that time, the driven member 14 will be lifted axially from surface 13a to the position shown in FIGURE 1 and the drive will be re-established. This suppression of the effect of the negative impulse or movement of the driven member toward the driving member as the driving member approaches the driven member not only permits pick up of the driven member at much higher passing velocities, but in effect prevents separation in practical operation.

A cylindrical guide ring 19, which forms a part of the meter mechanism, is concentric with and surrounds member 12 providing therewith an annular space for the passage of the driving magnetic member 15. In order to prevent the disabling of magnetic attraction between magnetic members 14 and 15 by a strong low frequency alternating or by a steady magnetic field adjacent the meter, a shield of magnetic material of high permeability is provided around paths of movement of members 14 and 15. The shield takes the form of a cylindrical member 23 seated within guide ring 19 and abutting an internal shoulder 24 thereon; a loosely fitting annular plate 25 resting upon the top of member 23; and an insert 26 within tubular member 12. Member 23, plate 25 and an insert 26 are all formed of magnetic material of high permeability to provide a low reluctance flux path for any externally applied magnetic field and thus prevent disturbance of the magnetic attraction between members 14 and 15. As is disclosed in the above-referred patent, the meter housing, of which wall 10 is a part, is preferably formed of electrically conductive material, such as bronze, and envelops the magnetic drive couplings so that it forms a shield to prevent interference from such alternating magnetic fields as would not be sufficiently diverted from the paths of movement of members 14 and 15 by the magnetic shield formed by members 23, 25 and 26.

The register mechanism is enclosed within a generally cup-shaped casing 27 of corrosion resistant material having a central bottom opening beneath an external flange 28 which is adjacent the top of and integral with tubular member 12. Flange 28 and casing 27 are joined in fluid tight relationship by a suitable means such as welding.

The casing 27 rests on top of the cup-shaped wall 10 at its opening 11. An annular sealing element 32 is in a recess or countersink in wall 10 adjoining its central opening 11. Casing 27, wall 10, sealing element 32, and tubular member 12 are held in rigid relationship by means of an internally threaded ring 29 which is threaded on to tubular member 12 at 31 compressing sealing element 32 and forming a fixed fluid seal preventing passage of fluid past the opening 11. An annular space between ring 29 and an inner peripheral groove adjacent the top of guide ring 19 receives a resilient O ring 33. In the final meter assembly the O ring 33, the ring 29 and the groove in guide ring 19 provide piloting surfaces for maintaining accurate alignment of the tubular member 12 relative to the guide ring 19 of the meter.

It should be noted that the method of mounting the register gear train and piloting it at 55 is purposely made independent of casing 27. It should also be noted that the alignment between tubular member 12 and ring 19 is obtained via ring 29 and O ring 33 and does not depend in any way on wall 10 or the rest of the meterhousing. Further alignment required in the mechanism is obtained step by step as you progress up the mechanism. At no time is the alignment between wall 10 and casing 27 functional.

A lightweight register drive spindle 34 preferably of wire and of minimum diameter (in practice on the order of .020 inch) is journalled for rotation in a pair of spaced bearing members 35 and 36 that are mounted in a central bore 37 in the insert 26. Member 36, which is formed of non-magnetic material, projects downwardly below the lower end of insert 26 and is of sufficiently large diameter relative to that of the member 14 and the inner cylindrical wall 12a to assure the maintenance of the member 14 in spaced relation from the end of insert 26 to prevent the establishment of an effective magnetic attraction therebetween if the register assembly is inverted as in shipment or storage. Primary or high speed drive pinion 38 is fixedly secured to the top of spindle 34 by means of a hub the lower face of which abuts the upper surface of upper member 35 and supports the drive spindle 34 against downward movement. Spindle 34 at its lower end is bent outwardly and then vertically to form a crank-like portion 39 that lies in the path of rotation of the driven magnetic member 14. As the driven member 14 rolls over the inner surface 12a of tubular member 12, it will drivingly engage the crank-like portion 39 of the register drive spindle 34, as best shown in FIGURES 1 and 3. As will more fully hereinafter appear, because of the extremely low inertia and friction and the low torque requirements of the gear train and register mechanism there is no chance of the magnetic driving member 15 going past the driven magnetic member 14 without picking it up and rotating the crank 39 and the register drive spindle 34. It should be noted that, as shown, the driven magnetic member 14 is completely free of axial restraint by crank 39.

Since there is no restraint upon the driven member 14 by the crank portion 39 of the register drive spindle 34, the inertia of the register drive train can have no effect upon the driven member 14 if the driving member 15 is suddenly brought to rest by suddenly shutting off the fluid passing through the meter. Thus the only inertia tending to separate the driving and driven members is that of the small driven member itself.

REGISTER MECHANISM AND DRIVING GEAR TRAIN

The total quantity of fluid that has passed through the meter is indicated by a pointer 42 (FIGURE 5) pivotally mounted centrally of an indicator dial 43, and a plural order counter mechanism 44, a peripheral portion of which is visible through a window 45 formed through the indicator dial 43. The register and driving gear train assembly is a compact unit formed of lightweight instrument type parts having low friction and inertia, and is hermetically sealed so that the corrosive atmosphere and elements to which meters of this type are normally subjected will not affect the accuracy and dependability of the unit. This assembly is best shown in FIGURES 2, 4 and 5.

Counter mechanism 44 and the various gears of the drive train from the register drive spindle 34 are supported upon a pair of lower and upper die-cast frame members 46 and 47 (FIGURES 2 and 5), each having the general shape of a yoke, as shown in FIGURE 2, and swaged together at 48 and 49 in the manner best shown in FIGURE 2A. A bracket 52 (FIGURE 5) having a central depressed portion 53 is secured to the bottom of frame member 46 as shown in FIGURES 2A and 5, the bottom ends of a pair of screws 48a and 49a, which extend through bores formed through member 46 coaxial with the swaged portions 48 and 49, being threaded into its outer end portions. An aperture 54 (FIGURE 5) is formed centrally through the depressed portion 53 of bracket 52 which, as shown in FIGURE 1, in assembly, surrounds and is fixedly attached to the upper portion of tubular member 12 above its flange 28. The gear train assembly is thus supported by bracket 52 upon flange 28 of tubular member 12. Insert 26, upon which spindle 34 is journalled, is freely but not loosely received within the upper end of member 12 and is formed at its upper end with an external cylindrical portion 55 which mates with an internal segmental cylindrical surface 56 to accurately position the drive pinion 38 in properly aligned axial relation to the gear train assembly and in proper mesh with high speed gear 86.

Figure 5:
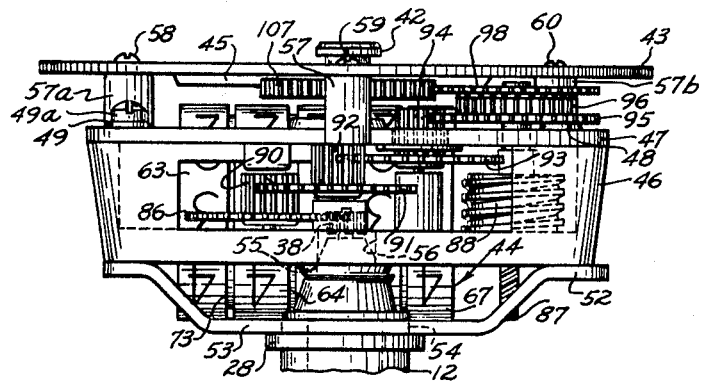
FIGURE 5 is an end view of the register assembly of FIGURE 2, as viewed from the right thereof.

Indicator dial plate 43, as is best shown in FIGURES 1 and 5, is supported in parallel spaced relation with the top surface of upper frame member 47 by three spaced bosses 57, 57a and 57b which are conveniently formed integral with upper member 47, plate 43 being secured to these bosses by screws 58, 59 and 60 (FIGURE 2) which are respectively threadedly engaged therewith.

The counter mechanism 44 is of generally conventional design, being generally of the intermediate pinion carry mechanism type similar to that disclosed in U.S. Patent No. 1,909,740 issued May 16, 1933 to Zubaty. This mechanism comprises a series of counter wheels 63–67 inclusive, the last four of which are journalled upon a shaft 68 (FIGURE 6), and the first of which is fixed thereon. These wheels represent, respectively, the units, tens, hundreds, thousands and ten thousands orders of the counter mechanism 44. Shaft 68 is journalled for rotation between the arms 71 and 72 (FIGURE 2) of the yoke shaped member 46, its opposite ends being received in recesses 71a and 72a respectively.

Figure 6:
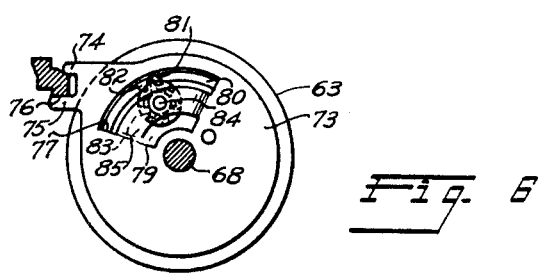
FIGURE 6 is a vertical section through the counter assembly, taken along the line 6—6 of FIGURE 2.

A carry pinion support plate 73, as shown in FIGURES 1, 2 and 6, is mounted intermediate each adjacent pair of counter wheels and each plate 73 is provided with a pair of ears 74 and 75 (FIGURE 6) which embrace a ledge 76 formed integrally with the upper die cast frame member 47 and extending parallel to the axis of shaft 68. The engagement of ears 74 and 75 with ledge 76 prevents rotative movement of the support plates 73 about the shaft 68. The face of each counter wheel which is adjacent the next lower order counter wheel is provided with a recess 77 (FIGURE 1) around the peripheral edge of which is formed a continuous row of internal annular teeth 78 coaxial with shaft 68. As is shown in FIGURE 6, each counter wheel face adjacent the next higher order is provided with a recess 79 on the peripheral edge of which is formed a pair of adjacent gear teeth 81 and 82 and a peripheral ledge 80 coaxial with shaft 68 and which is axially shorter than the length of gear teeth 81 and 82. A carry pinion 83 is journalled upon stub shaft 84 which is fixed to an off-set portion 85 (FIGURE 1) of the support plate 73. The teeth of pinion 83 are in constant mesh with the row of teeth 78 on the counter wheel of the next higher order and are of such formation that they coact with the pair of teeth 81 and 82 and the ledge 80 of the next lower order counter wheel in the manner of a Geneva movement.

In the particular embodiment disclosed, a complete revolution of a lower order counter wheel will advance the pinion 83 two teeth which, in turn, will advance the associated counter wheel by one unit or a tenth of a revolution by the advancement of the internal annular gear teeth 78 by two teeth. The teeth of pinion 83 coact with the ledge 80 to prevent movement of the pinion 83 of the adjacent higher order counter wheel except at the time when the teeth 81 and 82 engage the teeth of the pinion 83. The count of the counter mechanism 44 is advanced by rotation of shaft 68 to which the lowest order counter wheel 63 is fixed. Thus 10,000 revolutions of the shaft 68 will produce 10,000 revolutions of the counter wheel 63, 1000 revolutions of the counter wheel 64, 100 revolutions of wheel 65, 10 revolutions of wheel 66 and one revolution of wheel 67. Reference may be made to the aforesaid Zubaty Patent 1,909,740 for a more detailed explanation of the mode of operation of counter mechanisms of this type, if necessary.

Counter mechanism 44 is driven from spindle 34 by a gear train of small lightweight gears having low inertia and which requires a minimum of driving torque. Pinion 38 (FIGURES 1 and 5), fixed to the upper end of drive spindle 34, meshes with gear 86 (FIGURES 4 and 5). Input shaft 68 of counter mechanism 44 is driven by a worm wheel 87 (FIGURE 5) fixed thereto. Worm wheel 87 meshes with worm 88 which is fixed to and driven by a shaft 89 supported by and journalled at its lower end in frame member 47 (FIGURE 4). Shaft 89 is driven from gear 86, with which pinion 38 on spindle 34 is in mesh, by a reduction gear train consisting of a pinion 90 fixed to and rotatable with gear 86, a gear 91 in mesh with pinion 90, a pinion 92 fixed to gear 91, a gear 93 in mesh with pinion 92, a pinion 94 fixed to gear 93, a gear 95 in mesh with pinion 94, and a pinion 96 fixed to gear 95 in mesh with a gear 97. Gear 97 is fixed to gear 98 and both are fixed on the upper end of shaft 89. Thus, upon rotation of the spindle 34, the counter mechanism 44 is advanced through the action of this drive train.

The gear and pinion pairs 86–90, 91–92, and 93–94 are interchangeable and are journalled for rotation on parallel steel shafts 99 fixed in frame member 46. Pinions 90, 92 and 94 are preferably formed of bronze and provided with bores having bearing fits on shafts 99. Gears 86, 91 and 92 are staked on shoulders formed on pinions 90, 92 and 94 respectively and preferably formed of brass. The use of dissimilar metals in mating gears and pinions results in lowered frictional resistance and longer life of the gearing. By way of example of the lightweight parts used in the embodiment shown the diameter (within close tolerances) of shafts 99 is .046 of an inch, and gears 86, 91 and 93 each have 54 teeth, are .683 of an inch in outside diameter and are stamped from #24 (.0201) B & S brass, while pinions 90, 92 and 94 have 12 teeth and an outside diameter of .192 of an inch and are wide enough to provide for interchangeable use in the intermediate reduction stages.

Gear and pinion pair 95–96 is journalled on a pin 100 pressed into and extending upward from upper frame member 47. Pinion 94 extends upwardly through an aperture 101 in member 47 to mesh with gear 95, and shaft 89 extends upward through a bearing surface 102 in member 47 to support the gear pair 97–98. Gears 95 and 98 are of brass and are interchangeable. Gears 96 and 97 are like gears of different tooth numbers with gears 95 and 98 staked thereto and are formed of bronze with bores of the same size, so that gear pairs 95–96 and 97–98 may be interchanged.

Gears or pinions 96 and 97 are so selected that, when gear and pinions pairs or clusters 95–96 and 97–98 are interchanged, counter mechanism 44 will alternately register in ten gallon increments and in cubic feet the volume of fluid passed through the meter. In the register drive train illustrated in FIGURE 2, gears 95 and 98 each have 54 teeth, pinion 96 has 37 teeth, and pinion 97 has 32 teeth. Since, regardless of which pinion is driving, a 54 tooth gear is meshed with input pinion 94, the velocity ratio of the drive train is effected only by the change in velocity ratio between pinions 96 and 97 resulting from the transposition of gear clusters 95–96 and 97–98.

With gear clusters 95–96 and 97–98 assembled in the register drive train as shown in FIGURE 2, pinion 96 drives pinion 97 and the velocity ratio of these pinions, $$VR_{96-97'} = \frac{N_{97}}{N_{96}} = \frac{32}{37} = 0.864$$

where $N$ = the number of teeth on the pinions. When the gear clusters are transposed, pinion 97 drives pinion 96 and the velocity ratio, $$VR_{97-96'} = \frac{N_{96}}{N_{97}} = \frac{37}{32} = 1.158$$

The ratio of these two velocity ratios, $$\frac{VR_{96-97}}{VR_{97-96}} = \frac{0.864}{1.158} = 0.748$$

With the gear clusters assembled as shown, counter-mechanism 44 will register in cubic feet and the input shaft 68 of the counter mechanism must therefore be revolved through a predetermined angle (assumed for the purposes of the following discussion to be one revolution) for each cubic foot of fluid passed through the meter. There are approximately 7.48 gallons per cubic foot. Therefore, if gear clusters 95–96 and 97–98 are transposed to make counter mechanism 44 register in ten gallon increments, each cubic foot of fluid passed through the meter must cause counter mechanism input shaft 68 to make 0.748 revolution since $$R_{\text{cu. ft.}} = R_{\text{10 gal. inc.}} \times \frac{7.48}{10} = 0.748 \, R_{\text{10 gal. inc.}}$$

where $R_{\text{cu. ft.}}$ = number of revolutions of input shaft 68 for each cubic foot of fluid passed through the meter and $R_{\text{10 gal. inc.}}$ = numbers of revolutions of shaft 68 for each ten gallon increment of fluid passed through the meter.

This ratio is numerically the same as $$\frac{VR_{96-97}}{VR_{97-98}}$$

Therefore, with pinion 96 driving one cubic foot of fluid passed through the meter will cause counter mechanism input shaft 68 to revolve once and counter mechanism 44 will register in cubic feet. Conversely, with gear clusters 95–96 and 97–98 transposed and pinion 97 driving, one cubic foot of fluid passed through the member will cause input shaft 68 to make 0.748 revolution and counter mechanism 44 to register in ten gallon increments.

Although the effect of transposing gear clusters 95–96 and 97–98 has been discussed with reference to counter mechanism 44, it will be apparent that such transposition will have the same effect on pointer 42 since the pointer driving gear 107 is in constant mesh with one of the two 54 tooth gears 95 and 98 and is therefore moved in timed relation with input shaft 68 of counter mechanism 44. With pinion 96 driving, the digits (not shown) on indicator dial 43 represent cubic feet; with pinion 97 driving, the same digits represent ten gallon increments.

As best shown in FIGURE 4, indicating pointer 42 is fixed to a hollow hub 103 extending through an aperture 104 formed in the indicator dial 43. Hub 103 is also journalled on a fixed shaft 105 of the same size as shafts 99 fixed in a boss 106 on the upper frame member 47. Below dial 43 a gear 107 is fixed on a lower portion of hub 103 which is of reduced diameter and knurled. By this construction the dial 43, the pointer 42, hub 103 and gear 107 are removable as a subassembly after removal of the screws 58, 59 and 60 (FIGURE 2). As is shown in FIGURE 4, gear 107 is in mesh with gear 98 fixed to and rotatable with gear 97 and shaft 89 so that indicating pointer 42 is rotated about the shaft 105 in timed relation with the drive of the counter mechanism 44.

As will be apparent from the foregoing description, and as shown in FIGURE 4, all of the gears except 97 and 98 are journalled on fixed shafts in the die cast members 46 and 47 and may be readily dropped into place during assembly, providing economy of manufacture and ease of assembly.

As best shown in FIGURE 1, the register assembly is sealed in a cup-shaped casing 27 of corrosion resistant material having a radially enlarged portion 108 in which a transparent window 109 is mounted. Window 109 is held in sealed relation to the enlarged portion 108 of the casing 27 between a pair of annular gaskets 110 and 111, and the top peripheral edge 112 of casing 27 is spun over the gasket 110 to complete the assembly of the register and to form a permanently sealed unit into which neither dirt nor moisture can enter, and which cannot be disassembled without destruction of the casing 27. To absorb any initial moisture that may be trapped in the assembly during manufacture a small quantity of hygroscopic material may be sealed into the cup. Thus tampering with the register by unauthorized persons is prevented and long life and reliable performance of the mechanism is assured.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. In a flow meter, a flow measuring device, a register, a drive train operatively connecting said device and said register, and a pair of interchangeable gear clusters each having a drive gear and a driven gear operatively connected in said drive train, said gears being so constructed that interchanging of said gear clusters drive gear for drive gear and driven gear for driven gear causes the registration to be in alternate ones of two flow units.

2. The flow meter as defined in claim 1, wherein said interchangeable gear clusters are so constructed that said register may be made to alternately register in cubic feet and in gallons.

3. In a flow meter including a flow measuring device, a register, and a register drive train operatively interposed between said measuring device and said register, the improvement comprising transposable gear clusters each gear of which is operatively connected in said drive train said gear clusters being transposable for alternating the drive train velocity ratio between two different values and thereby causing flow through said meter to be registered in alternate ones of two units of measurement.

4. In a fluid meter having a meter housing, a metering component driven permanent magnet movable in response to flow of fluid, and a fluid meter register adapted to be fixed to said housing, said fluid meter register comprising a register subassembly and an internally hollow hermitically sealed imperforate multi-component register casing having a transparent window with said register subassembly being structurally distinct from said multi-component register casing and being mounted within said register casing solely on only one of the components of said register subassembly comprising a plural order counter mounted within said casing adjacent said window and readable therethrough and a register drive magnetic element within said casing, a drive train including a pair of interchangeable gear clusters each gear of which is operatively connected in said drive train, said gear clusters being interchangeable for alternating the drive train velocity ratio between two different values to cause flow through said meter to be registered in alternate ones of two units of measurement drive connecting said magnetic element to the lowest order of said counter with said register drive magnetic element being magnetically coupled to said metering driven permanent magnet by a magnetic force transmitted through said one component mounting said register subassembly, the components of said casing cooperating with each other to enable access to the interior of said casing only by unconcealable destructive mutilation of at least one of said components.

5. In a fluid meter having a meter housing, a register assembly adapted to be fixed to said meter housing and comprising a multi-component register casing delimiting a confined space, and a register subassembly structurally distinct from said register casing and mounted in said space solely on only one of the components of said register casing, said subassembly comprising a pair of spaced supporting frame members rigidly connected together and mounted on said one component of said register casing, a counter mechanism supported on at least one of said frame members, a speed reducing gear train driving said counter mechanism and including a series of fixed parallel shafts with meshing pairs of relatively large driven and relatively small drive gears journalled thereon, some of said shafts being solely mounted on and fixed to one of said frame members and terminating in spaced relation to the other of said frame members at one end and others of said shafts being mounted solely on and fixed to the other of said frame members and terminating in spaced relation to said one frame member, said frame members cooperating with each other to axially retain said relatively large driven and said relatively small drive gears on those shafts fixed to one of said frame members, two of said meshing pairs of gears being interchangeable to alternate the gear train velocity ratio between two different values to cause flow through said meter to be registered in alternate ones of two units of measurement.

6. In a fluid meter having a meter housing, a register assembly adapted to be fixed to said meter housing and comprising a multi-component register casing delimiting a confined space, and a low torque register mechanism structural distinct from said register casing and mounted in said space solely on only one of the components of said register casing, said low torque register mechanism comprising: an indicating pointer, a plural order counter mechanism including a series of counter wheels of different orders and a common shaft for said wheels, a speed reducing gear train including a plurality of parallel shafts with gear clusters each including a relatively large driven and relatively small drive gear journalled thereon and operatively connected in said gear train, an input pinion and an output shaft for said gear train, a pair of spaced supporting members rigidly connected together, some of said parallel shafts being mounted solely on and fixed at one end to one of said members and the remainder being mounted solely on and fixed at one end to the other of said members with said frame members cooperating with each other to axially retain said relatively large driven and said relatively small drive gears on those shafts fixed to one of said members, two of said gear clusters being interchangeable to alternate the gear train velocity ratio between two different values to cause flow through said meter to be registered in alternate ones of two units of measurement, means supporting said common shaft between said pair of spaced members, and a drive connection between said output shaft, said indicator pointer and said counter mechanism.

7. In a fluid meter, having a meter housing, a register assembly adapted to be fixed to said meter housing and comprising a multi-component register casing delimiting a confined space and a low torque register mechanism structurally distinct from said register casing and mounted in said space solely on only one of the components of said register casing, said low torque register mechanism comprising: a plural order counter mechanism including a series of counter wheels of different orders and a common shaft for said wheels, a reducing speed gear train including a plurality of parallel shafts, pairs of meshing relatively large driven and relatively small drive gears journalled on said shafts, two of said meshing pairs of gears being interchangeable to alternate the gear train velocity ratio between two different values to cause flow through said meter to be registered in alternate ones of two units of measurement, an output shaft driven by said gear train, a pair of spaced supporting members rigidly connected together, some of said parallel shafts being mounted solely on and fixed at one end to one of said members and the remainder being mounted solely on and fixed at one end to the other of said members with said supporting members cooperating with each other to axially retain said relatively large driven and said relatively small drive gears on those shafts fixed to one of said members, means supporting said common shafts between said pair of spaced supporting members, and a drive connection between said output shaft and said counter mechanism including a worm having an axis passing through both of said supporting members, and a worm gear driven by said worm about the axis of said common shaft.

References Cited by the Examiner

UNITED STATES PATENTS

| | | | |
|---|---|---|---|
| 1,462,675 | 7/1923 | Whittington | 74—325 |
| 1,659,437 | 2/1928 | Merryweather | 74—325 |
| 1,688,505 | 10/1928 | Mulder | 73—254 X |
| 1,712,956 | 5/1929 | Gustafson | 74—325 XR |
| 1,964,352 | 6/1934 | Hazard | 235—94 X |
| 2,207,182 | 7/1940 | Smith | 73—254 X |
| 2,487,783 | 11/1949 | Bergman | 73—257 |
| 2,627,747 | 2/1953 | Miller | 73—257 |
| 2,857,763 | 10/1958 | Hague et al. | 73—257 |

LEO SMILOW, *Primary Examiner.*